Sept. 18, 1956          G. HERZOG          2,763,788
INDUCED AND SCATTERED GAMMA RAY WELL LOGGING
Filed Dec. 22, 1950
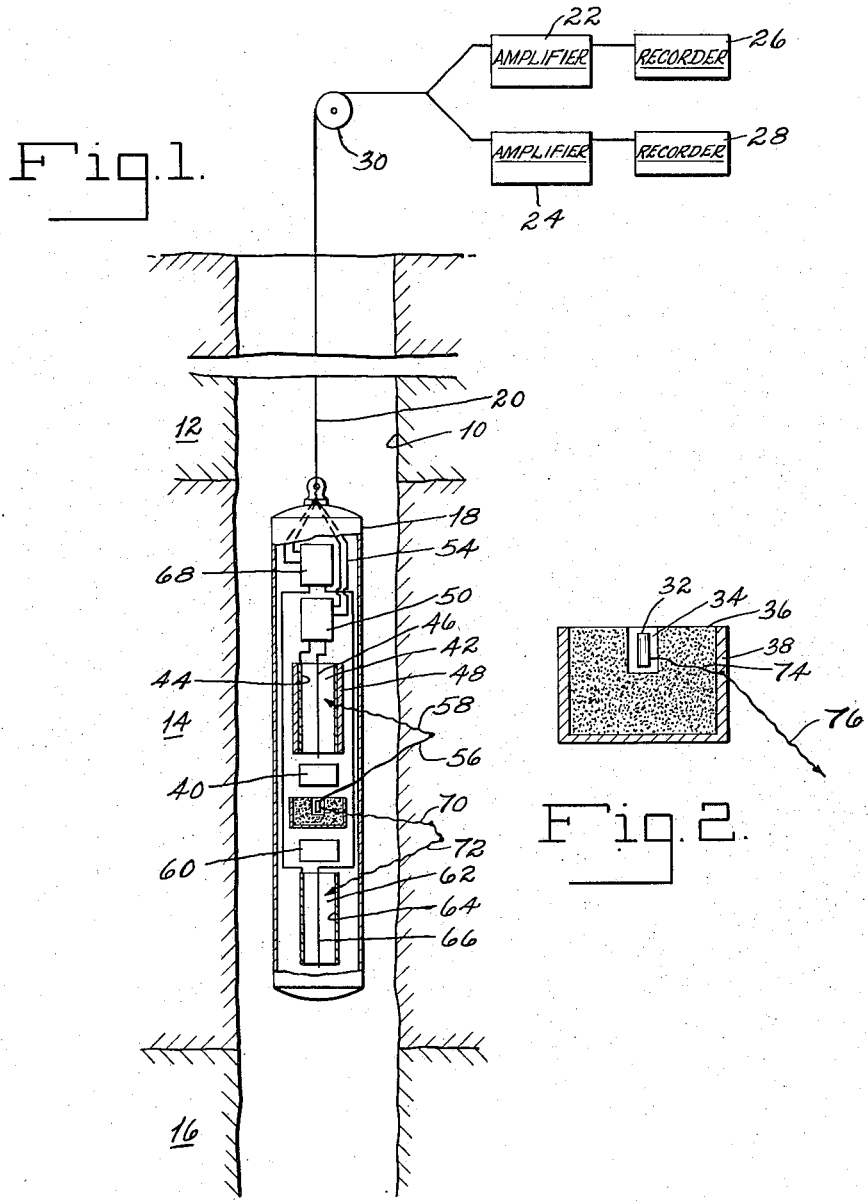
INVENTOR.
GERHARD HERZOG
BY Daniel Stryker
J. H. Grahame
ATTORNEYS

United States Patent Office 2,763,788
Patented Sept. 18, 1956

2,763,788

INDUCED AND SCATTERED GAMMA RAY WELL LOGGING

Gerhard Herzog, Houston, Tex., assignor to The Texas Company, New York, N. Y., a corporation of Delaware Application December 22, 1950, Serial No. 202,317

5 Claims. (Cl. 250—83.6)

This invention relates to radioactivity well or bore hole logging, and more particularly to a method and apparatus for simultaneously obtaining two different radioactivity logs of a bore hole, one of these logs indicating the porosity or hydrogen content and the other log indicating the density of the formations traversed by the bore hole. The principal object of the invention is the provision of means whereby, although gamma rays are measured in each log, the measurement of the gamma rays indicating hydrogen content will be substantially unaffected by the gamma rays indicating the density of the formation and vice versa.

In making a log of formations traversed by a bore hole to determine the porosity or hydrogen content of the formations, the induced gamma ray method is frequently used. In this method, sometimes known as the neutron-gamma ray method, a source of neutrons is passed through the bore hole together with a gamma ray detector. Neutrons from the source pass outwardly into the surrounding formations where they may, by nuclear reaction with the atoms of the formations, cause gamma rays to be ejected or induced, some of these gamma rays passing back into the bore hole where they strike the detector. By suitably amplifying and recording the variations in the intensities of the measured induced gamma rays, knowledge can be had as to the porosity or hydrogen content of the formations.

Unless a neutron source is used which does not emit gamma rays, such, for example, as a mixture of polonium and beryllium, gamma rays emitted from the source will also pass outwardly into the formations where they are scattered, with some returning to be registered by the detector. Those scattered gamma rays which are registered produce spurious indications in the induced gamma ray record and it is therefore very desirable that the effect of these scattered gamma rays in an induced gamma ray log be minimized as far as possible.

Useful information is also obtained from a scattered gamma ray log, sometimes known as the gamma ray-gamma ray log, since variations in the intensity of the measured scattered gamma rays is an indication of the density of the formation being bombarded with the gamma rays from the source. To make such a log, a source of gamma rays is passed through the bore hole along with a gamma ray detector, the gamma rays from the source penetrating the surrounding formations wherein they are scattered so that some return to the hole to be registered by the detector. In making such a log when a neutron-gamma ray source is used it is of course desirable that gamma rays induced by neutron bombardment be suppressed, or their effect minimized on the scattered gamma ray detector.

When the two logs, i. e., the induced gamma ray log and the scattered gamma ray log are made separately, this of course necessitates two round trips of a logging instrument through the bore hole and this, together with the time required for rigging up the different instruments, adds materially to the time when the drilling operations must be suspended. However, a more important disadvantage of the making of two separate logs resides in the fact that due to cable stretch and other factors it is very difficult, if not impossible, to coordinate the two logs as to depth in the hole. It is, of course, very desirable that the exact depths be known in the two logs so that, say, the density log can be placed accurately alongside the porosity log as an aid in obtaining the maximum information possible. With the invention about to be described, the two logs are made simultaneously with detectors maintained in fixed position with respect to the source and to each other, so that the information obtained in one log can easily be correlated with that obtained in the other log.

In accordance with this invention a source of gamma rays and neutrons is passed through the hole together with a detector for the induced gamma rays and a second detector for the scattered gamma rays and the source is mounted in such a way that there will be little likelihood of the scattered gamma rays reaching the induced gamma ray detector, as well as little likelihood that the induced gamma rays will reach the scattered gamma ray detector.

In carrying out the invention the neutron-gamma ray source is mounted in the upper center portion of a mass of material such as paraffin which will slow down those neutrons tending to pass horizontally or downwardly from the source. The paraffin is surrounded at its sides and bottom by a layer of material such as cadmium which serves to absorb the neutrons which have been slowed down so that they will not pass outwardly into the surrounding formations.

The induced gamma ray detector is disposed above the source and separated therefrom by a shield of lead or the like, which prevents the gamma rays emitted by the source from passing directly upwardly to the detector. This detector is also preferably surrounded by a layer of gamma ray absorbing material, such as lead, of sufficient thickness to absorb the low energy scattered gamma rays, but not thick enough to absorb the higher energy induced gamma rays. Below the source and separated therefrom by a shield of gamma ray absorbing material is the second or scattered gamma ray detector. Neutrons emitted by the source can pass upwardly and outwardly into the formations around the bore hole so as to induce gamma rays from these formations, some of which will pass back to strike the induced gamma ray detector. However, as stated above, those neutrons which tend to pass horizontally or downwardly from the source will be slowed down and absorbed before they get out of the logging instrument, and these neutrons will therefore not enter the formations below the level of the source so as to induce gamma rays which might return to the hole to strike the lower scattered gamma ray detector.

It is also preferred that the cathode material of the induced gamma ray detector be formed of a low atomic number metal such as aluminum or brass, since a cathode of this type is preferentially sensitive to the higher energy induced gamma rays, rather than to the lower energy scattered gamma rays. It is also preferred that the cathode of the scattered gamma ray detector be formed of a high atomic number metal such as tantalum or lead, since such a cathode is preferentially sensitive to the detection of the lower energy scattered gamma rays, rather than to the higher energy induced gamma rays. If additional explanation is desired of the fact that a cathode formed of a high atomic number metal such as tantalum or lead is preferentially sensitive to the detection of low energy scattered gamma rays rather than the higher energy induced gamma rays, reference may be had to the U. S. Letters Patent No. 2,601,334, granted June 24, 1952 to A. J. F. Siegert on an application filed March 5, 1949, Serial No. 79,773. This Siegert patent is a division of original application Serial No. 600,865, filed June 22, 1945, now abandoned.

For a better understanding of the invention, reference may be had to the accompanying drawing in which:

Figure 1 is a vertical, sectional elevation through a portion of a bore hole showing suspended therein an instrument embodying the features of the invention, and Figure 2 is an enlarged vertical sectional elevation of the neutron-gamma ray source.

Referring to the drawing, a bore hole 10 is shown as traversing subsurface formations such as those indicated at 12, 14 and 16. The bore hole may or may not be provided with a casing, since the neutrons and gamma rays are capable of passing through the conventional well casing without material loss. A sealed instrument housing 18 is suspended within the bore hole from a cable 20 which also contains electrical conductors for carrying the output of the detectors upwardly to suitable amplifiers 22 and 24 connected respectively to recorders 26 and 28 at the surface. The cable 20 passes over a suitable measuring reel or drum 30 which in any suitable manner well known to those familiar with this art serves to indicate or measure the depth of the instrument 18 in the bore hole.

Within the instrument housing 18 is a source 32 of neutrons and gamma rays, such for example as a mixture of radium and beryllium. The source 32 is disposed in a small hole 34 in the upper surface of a cylindrical mass of paraffin 36 or some other material capable of slowing down the neutrons which pass into it from the source. The mass 36 is surrounded at its sides and bottom by a cup-shaped layer 38 of a material such as cadmium, capable of absorbing those neutrons which reach it after being slowed down in the paraffin 36.

Disposed above the source 32 and separated from it by a shield 40 of gamma ray absorbing material, such as lead, is a gamma ray detector 42 for induced gamma rays. This detector may be a conventional Geiger-Mueller counter and is illustrated as having a cylindrical cathode 44 and a centrally disposed anode wire 46. It is to be understood that the illustration of the detector is somewhat diagrammatic and that the detector electrodes will be disposed in a suitable casing or envelope containing an ionizable gas. Surrounding the sides of the detector 42 is a layer 48 of a material such as lead of a thickness sufficient to absorb most of the low energy scattered gamma rays originating in the source 32 before these gamma rays reach the detector to be registered thereby. The electrodes of the detector 42 are connected to a suitable preamplifier 50, the output of which is connected by wires 54 to the cable 20 and from the upper end of the cable to the amplifier 22 and the recorder 26.

In the operation of the apparatus thus far described, while the instrument 18 is passed through the bore hole, neutrons from the source 32, such as the one indicated at 56 in Figure 1, pass outwardly in an upwardly inclined direction to penetrate or bombard the surrounding formations where they may strike atoms of these formations to induce gamma rays therefrom, such as the one indicated at 58, some of these induced gamma rays passing back into the bore hole to strike the detector 42 to be registered thereby. Since induced gamma rays are generally of considerably higher energies than scattered gamma rays, these induced gamma rays will pass through the shield 48 into the detector, whereas most of the gamma rays originating in the source 32 and passing into the surrounding formations to be scattered therein and returning toward the detector 42, will be absorbed in the shield 48 so that they will not strike the detector to cause spurious counts and thus improper indications on the record produced by the device 26.

Disposed below the source 32 and separated therefrom by a gamma ray shield 60 of lead or the like is a second gamma ray detector or counter 62 for scattered gamma rays, this detector having a cathode 64 and an anode 66 connected to a preamplifier 68, the output of which passes through the cable 20 to the amplifier 24, the output of which in turn passes to the recorder 28. Gamma rays from the source 32 such as the one indicated at 70 pass outwardly into the formations where they are scattered, with some, for example the one indicated at 72, passing back into the hole to strike the detector 62. As stated hereinabove, the intensity of these scattered gamma rays will be recorded by the device 28 and variations in the intensity shown in the record will serve to indicate the densities of the formations through which the instrument is passed.

Those neutrons originating in the source 32 which pass horizontally outwardly or downwardly from the source, such as the one indicated at 74, will be slowed down in the material 36 and will then be absorbed in the cadmium layer 38, so that they will not pass outwardly into the formations to induce gamma rays therein which might otherwise be registered by the detector 62 to cause spurious readings in the scattered gamma ray log record.

Some of the slowed neutrons entering the cadmium layer 38 may cause gamma rays, such as the one indicated at 76, to be ejected from the cadmium, these ejected gamma rays then entering the formations in which they may be scattered and returned to be registered by the detector 62. Since these are also "scattered" gamma rays, they will tend to supplement the gamma rays 70 and a more accurate log will thus be obtained.

In order to further increase the effectiveness of the induced gamma ray log and the scattered gamma ray log, it is, as has been mentioned hereinbefore, preferred that the cathode 44 of the detector 42 be formed of a low atomic number metal which is preferentially more sensitive for the detection of high energy gamma rays, i. e., induced gamma rays, than low energy gamma rays, i, e., those which are scattered in the formations. Likewise, it is preferred that the cathode 64 of detector 62 be formed of a high atomic number metal such as tantalum or lead which is preferentially more sensitive for the detection of low energy, i. e., scattered gamma rays, than for the detection of the higher energy induced gamma rays.

It will be seen that with the provision of the shield 48 and a low atomic number cathode in the detector 44, an accurate and effective induced gamma ray log will be obtained. Likewise, by using a high atomic number metal for the cathode 64 and by preventing the neutrons from the source from inducing gamma rays in the formations surrounding the detector 62, an effective scattered gamma ray log will also be produced.

Although it has been stated that the detectors 42 and 62 may be of the conventional Geiger-Mueller counter type, it is preferred that these detectors be of the more sensitive multi-cathode plate type, such as are described in the U. S. Letters Patent No. 2,397,071, granted March 19, 1946 to D. G. C. Hare. These detectors contain considerably more effective cathode material than the conventional Geiger-Mueller counter and the beneficial effect of using the proper cathode material as is described above, is increased when counters of this type are utilized. If desired, ionization chambers can be used as the detectors.

If desired, the cadmium shield 38 can cover the upper side of the source 32 and paraffin 36. Neutrons which travel upwardly pass through only a limited amount of paraffin and therefore are not slowed down to such a degree that the cadmium would capture or absorb them.

Gamma rays are, of course, constantly being emitted from the subsurface formations and it to be understood that the size of the source and the arrangement of the detectors is such that the intensities corresponding to the induced gamma rays and the scattered gamma ray logs are considerably in excess of the intensities due to the natural gamma rays. Therefore, in making the induced and scattered gamma ray logs the influence of the natural radioactivity can be neglected. However, it is well known that the information obtained by logging these naturally occurring gamma rays is valuable. If desired, a third gamma ray detector can be disposed within the instrument housing and connected with suitable amplifiers and a recorder so as to register variations in the intensities of the natural gamma rays as the instrument is passed through the hole. Such a gamma ray detector should of course be separated vertically from the neutron-gamma ray source by a distance such that it will not respond to the gamma rays induced or scattered in the formations due to bombardment thereof from the source.

Obviously many modifications and variations of the invention as hereinbefore set forth may be made without departing from the spirit and scope thereof, and only such limitations should be imposed as are indicated in the appended claims.

I claim:

1. The method of making simultaneous induced gamma ray and scattered gamma ray logs of the formations surrounding a bore hole which comprises passing a source of neutrons and gamma rays through the hole, bombarding the formations with neutrons and gamma rays from said source, measuring in a first zone in the vicinity of the source gamma rays induced in the formations due to the neutron bombardment and returned to the hole while suppressing from said measurement gamma rays scattered in the formations due to the bombardment thereof by gamma rays, simultaneously measuring in a second zone in the vicinity of the source gamma rays from said source which are scattered in the formations and returned to the hole while absorbing those neutrons which might, if not so absorbed, penetrate the formations to induce gamma rays therein, which last mentioned gamma rays might cause spurious indications in the said measurement of scattered gamma rays in said second zone.

2. The method defined in claim 1 in which the induced gamma rays are measured in said first zone by permitting gamma rays induced in the formations due to the neutron bombardment to intercept a detector cathode of low atomic number, and in which the scattered gamma rays are measured in said second zone by permitting gamma rays scattered in the formations to strike a detector cathode of high atomic number.

3. A radioactivity well logging instrument comprising a sealed housing adapted to be passed through a bore hole traversing subsurface formations, a source of neutrons and gamma rays in said housing, a pair of gamma ray detectors, one disposed above and one below said source, direct gamma ray shields between said source and said detectors, means for shielding one of said detectors from gamma rays scattered in the surrounding formations so that said detector will respond primarily to gamma rays induced in the formations by bombardment thereof by neutrons from said source, and means for absorbing those neutrons originating in said source and which would otherwise penetrate the formations to induce therein gamma rays which might be intercepted by the other detector.

4. A radioactivity well logging instrument comprising a sealed housing adapted to be passed through a bore hole traversing subsurface formations, a source of neutrons and gamma rays in said housing, a pair of gamma ray detectors, one disposed above and one below said source, direct gamma ray shields between said source and said detectors, means for shielding the upper detector from gamma rays scattered in the surrounding formations so that said detector will respond primarily to gamma rays induced in the formations by bombardment thereof by neutrons from said source, a mass of material surrounding the sides and bottom only of said source for slowing down neutrons originating in the source and tending to pass horizontally and downwardly therefrom, and a layer of neutron absorbing material surrounding the sides and bottom of said mass for absorbing the neutrons which are slowed down in said mass, the arrangement being such that the detector below the source will respond to gamma rays originating in the source and scattered in the surrounding formations rather than to gamma rays which might otherwise be induced in said formations by bombardment thereof by neutrons from said source.

5. A radioactivity well logging instrument as defined in claim 4 in which the two detectors are of the electrical pulse-producing type, each having a cathode and an anode, the cathode of the upper detector being formed of a low atomic number metal and the cathode of the lower detector being formed of a high atomic number metal.

References Cited in the file of this patent

UNITED STATES PATENTS

| 2,285,840 | Scherbatskoy | June 9, 1942 |
| 2,475,137 | Herzog | July 5, 1949 |
| 2,508,772 | Pontecorvo | May 23, 1950 |
| 2,512,020 | Herzog | June 20, 1950 |

OTHER REFERENCES

Increased Gamma-Ray Sensitivity of Tube Counters etc., Evans et al., Rev. of Sci. Instruments, December 1936, vol. 7, pp. 441–449.